(12) United States Patent
Kasahara et al.

(10) Patent No.: US 10,726,809 B2
(45) Date of Patent: Jul. 28, 2020

(54) IMAGE DISPLAY APPARATUS AND CONTROL METHOD THEREFOR

(71) Applicant: SEIKO EPSON CORPORATION, Tokyo (JP)

(72) Inventors: Daisuke Kasahara, Shiojiri (JP); Takeshi Furihata, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/172,150

(22) Filed: Oct. 26, 2018

(65) Prior Publication Data

US 2019/0130868 A1 May 2, 2019

(30) Foreign Application Priority Data

Oct. 27, 2017 (JP) ................... 2017-207922

(51) Int. Cl.
| | |
|---|---|
| *G09G 5/00* | (2006.01) |
| *H04N 9/31* | (2006.01) |
| *G03B 21/14* | (2006.01) |
| *G06F 11/22* | (2006.01) |
| *G09G 3/20* | (2006.01) |
| *G09G 3/00* | (2006.01) |
| *G06F 1/18* | (2006.01) |
| *G09G 5/04* | (2006.01) |
| *G09G 5/06* | (2006.01) |

(52) U.S. Cl.
CPC .............. *G09G 5/006* (2013.01); *G03B 21/14* (2013.01); *G06F 1/185* (2013.01); *G06F 11/22* (2013.01); *G09G 3/001* (2013.01); *G09G 3/2092* (2013.01); *G09G 5/003* (2013.01); *G09G 5/04* (2013.01); *G09G 5/06* (2013.01); *H04N 9/3141* (2013.01); *H04N 9/3194* (2013.01); *G09G 2354/00* (2013.01); *G09G 2370/025* (2013.01); *G09G 2370/12* (2013.01)

(58) Field of Classification Search
None
See application file for complete search history.

(56) References Cited

U.S. PATENT DOCUMENTS

| | | | |
|---|---|---|---|
| 2008/0183933 A1* | 7/2008 | Peng ..................... | G06F 1/181 710/302 |
| 2013/0162908 A1* | 6/2013 | Son .......................... | H04N 5/14 348/571 |
| 2019/0187546 A1 | 6/2019 | Furihata et al. | |

FOREIGN PATENT DOCUMENTS

| | | |
|---|---|---|
| JP | 2009-296404 A | 12/2009 |
| JP | 2011-40642 A | 2/2011 |
| JP | 2019-109413 A | 7/2019 |

* cited by examiner

*Primary Examiner* — Kenneth B Lee, Jr.
(74) *Attorney, Agent, or Firm* — Oliff PLC (57) ABSTRACT

An image display apparatus includes a display unit that displays an image, a connection unit connected to a replaceable interface board and communicating with an external apparatus via the interface board; and a control unit that determines a type of the interface board connected to the connection unit and restricts power supply to the interface board based on the type of the interface board.

8 Claims, 9 Drawing Sheets

IMAGE DISPLAY APPARATUS AND CONTROL METHOD THEREFOR

CROSS-REFERENCE

The entire disclosure of Japanese Patent Application No. 2017-207922, filed Oct. 27, 2017 is expressly incorporated by reference herein.

BACKGROUND

1. Technical Field

The present invention relates to an image display apparatus that displays images and a control method therefor.

2. Related Art

In an image display apparatus that displays images, various connection terminals (interfaces) for connection to external apparatuses are provided (for example, see Patent Document 1 (JP-A-2009-296404)). However, convenience of users may be impaired because desired connection terminals are not provided due to constraints of space, cost, or the like and, when the connection terminals, peripheral circuits therefor, or the like fail, the whole display apparatuses should be sent for repair. Accordingly, a configuration such as an expansion slot in a personal computer is desirable for the user to add an interface board having a desired connection terminal.

However, in a configuration to which the user can freely add an interface board, in the case where power consumption of the added interface board is larger or the like, excessive electric power may be supplied from the display apparatus to the interface board and the operation of the display apparatus may be unstable.

SUMMARY

An advantage of some aspects of the invention is to solve at least a part of the problems described above, and the invention can be implemented as the following forms or application examples.

Application Example 1

An image display apparatus according to this application example includes a display unit that displays an image, a connection unit connected to a replaceable interface board and communicating with an external apparatus via the interface board, a determination unit that determines a type of the interface board connected to the connection unit, and a control unit that restricts power supply to the interface board based on the type of the interface board determined in the determination unit.

According to the image display apparatus, the control unit restricts the power supply to the interface board based on the type of the interface board connected to the connection unit, and thereby, it may be possible not to supply power to the interface board of a specific type and to restrict the amount of power supply. As a result, supply of excessive electric power to the interface board can be suppressed.

Application Example 2

In the image display apparatus according to the application example, it is desirable that a plurality of the interface boards can be connected to the connection unit, and the control unit restricts power supply to the interface boards based on the number of the interface boards connected to the connection unit.

According to the image display apparatus, the control unit restricts the power supply to the interface boards based on the number of the interface boards connected to the connection unit, and thereby, even when the plurality of interface boards are connected to the connection unit, supply of excessive electric power to the interface boards can be suppressed.

Application Example 3

In the image display apparatus according to the application example, it is desirable that a setting unit for setting the interface board to be enabled or disabled is further provided, and the control unit restricts power supply to the interface board when the interface board is set to be disabled.

According to the image display apparatus, power consumption by the interface board set to be disabled can be suppressed.

Application Example 4

In the image display apparatus according to the application example, image information may be input from the external apparatus to the connection unit via the interface board, and the display unit may display the image based on the image information input to the connection unit.

According to the image display apparatus, the image information is input via the interface board connected to the connection unit, and thereby, image information in various formats can be input by addition or replacement of the interface board.

Application Example 5

In the image display apparatus according to the application example, it is desirable that, when a first interface board and a second interface board are connected to the connection unit as the interface boards and power supply to the first interface board is restricted, the display unit displays the image based on the image information input to the second interface board.

According to the image display apparatus, when the power supply to the first interface board is restricted, the display unit displays the image based on the image information input to the second interface board, and thereby, unavailability of the image display apparatus due to an abnormality of the single interface board or the like may be avoided.

Application Example 6

In the image display apparatus according to the application example, the connection unit may transmit and receive control information to and from the external apparatus via the interface board.

According to the image display apparatus, the control information is transmitted and received via the interface board connected to the connection unit, and thereby, control information in various formats can be transmitted and received by addition or replacement of the interface board.

Application Example 7

In the image display apparatus according to the application example, it is desirable that, when acquiring connection information representing that the interface board is appropriately connected to the connection unit from the interface board, the control unit starts power supply to the interface board.

According to the image display apparatus, the control unit starts the power supply to the interface board when acquiring the connection information from the interface board, and thereby, power supply to the interface board not appropriately connected is suppressed.

Application Example 8

A control method for an image display apparatus according to the application example is a control method for an image display apparatus connected to a replaceable interface board and communicating with an external apparatus via the interface board, including determining a type of the connected interface board, and restricting power supply to the interface board based on the determined type of the interface board.

According to the control method for an image display apparatus, the power supply to the interface board is restricted based on the type of the connected interface board, and thereby, it may be possible not to supply power to the interface board of a specific type and to restrict the amount of power supply. As a result, supply of excessive electric power to the interface board can be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a projector as an image display apparatus will be explained with reference to the drawings.

Figure 1:
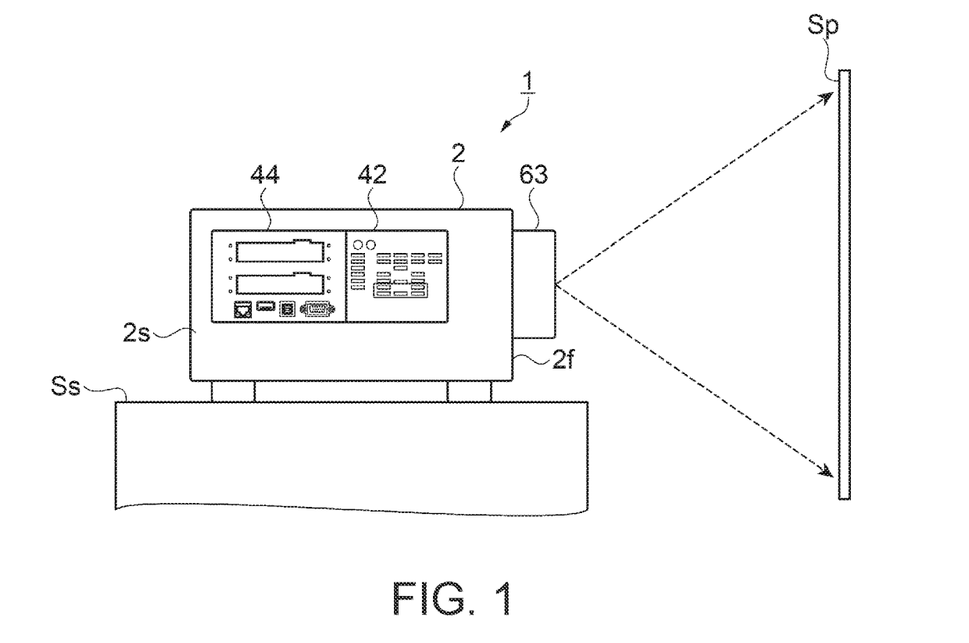
FIG. 1 is a side view showing a projector.
Figure 2:
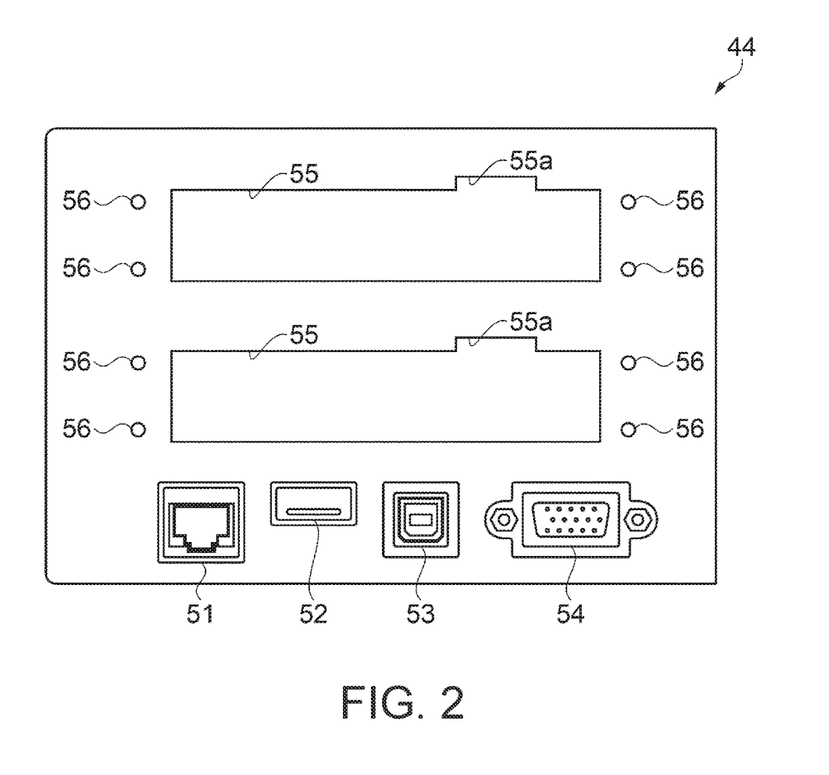
FIG. 2 is an enlarged view of an interface panel.

FIG. 1 is a side view showing a projector 1 of the embodiment, and FIG. 2 is an enlarged view of an interface panel 44 placed on a side surface of the projector 1. As shown in FIG. 1, the projector 1 is installed and used on an installation surface Ss and projects images on a projection surface Sp such as a screen or wall surface. The projector 1 includes a housing 2 housing the apparatus main body and a projection system 63 that projects images is exposed on a front surface 2f of the housing 2. On a side surface 2s of the housing 2, an operation panel 42 on which input operation is performed by a user and the interface panel 44 to which external apparatuses etc. are connected are disposed.

As shown in FIG. 2, a plurality of connection terminals to be connected to external apparatuses are placed on the interface panel 44. Specifically, the interface panel 44 includes a LAN (Local Area Network) terminal 51 as a connection terminal for connection to a network, and USB (Universal Serial Bus) terminals 52, 53 and an RS-232C terminal 54 as connection terminals for connection of external control apparatuses (e.g. personal computer), peripheral apparatuses, etc. Further, in the interface panel 44, two slots (opening portions) 55 into which an interface board 10 (see FIGS. 3 and 4) can be inserted are formed, and two screw holes 56 are formed on both right and left sides of each slot 55. The projector 1 is supplied with image information from an external apparatus via the interface board 10 inserted into the slot 55 and projects an image based on the image information.

Figure 3:
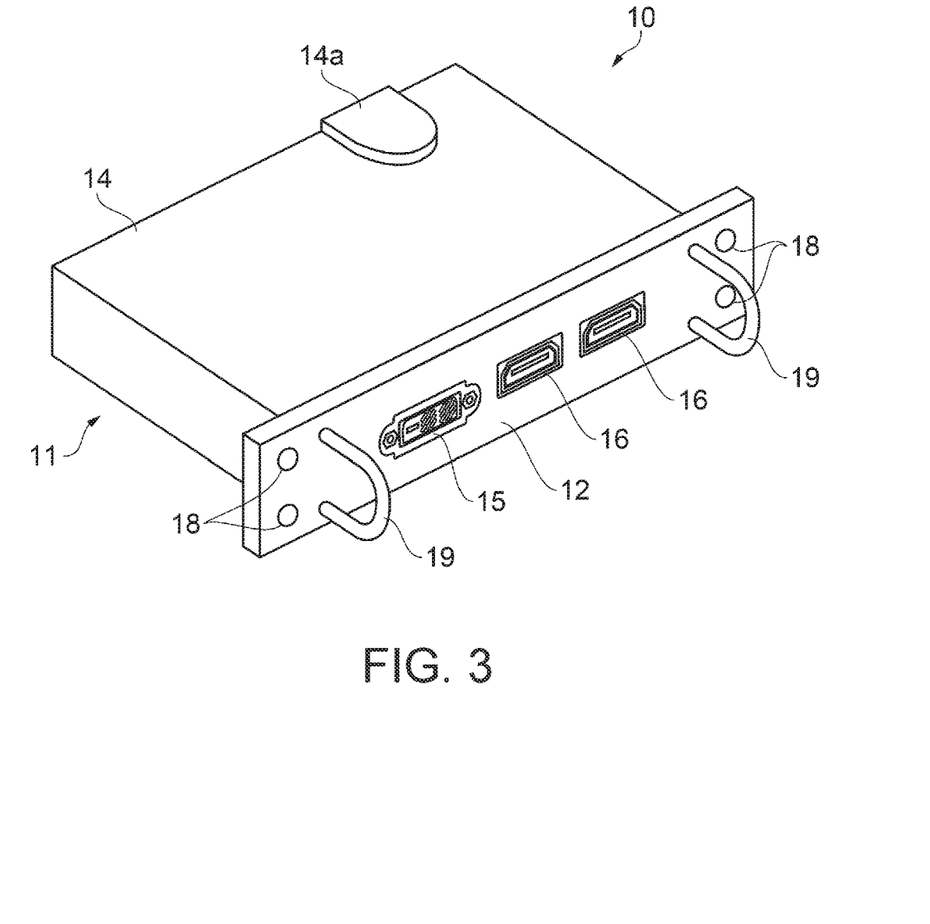
FIG. 3 is a perspective view showing an interface board.
Figure 4:
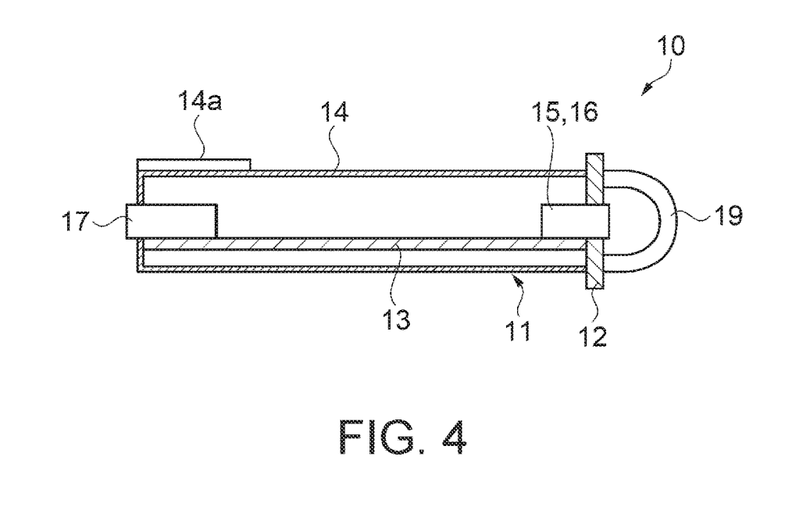
FIG. 4 is a side sectional view of the interface board.
Figure 5:
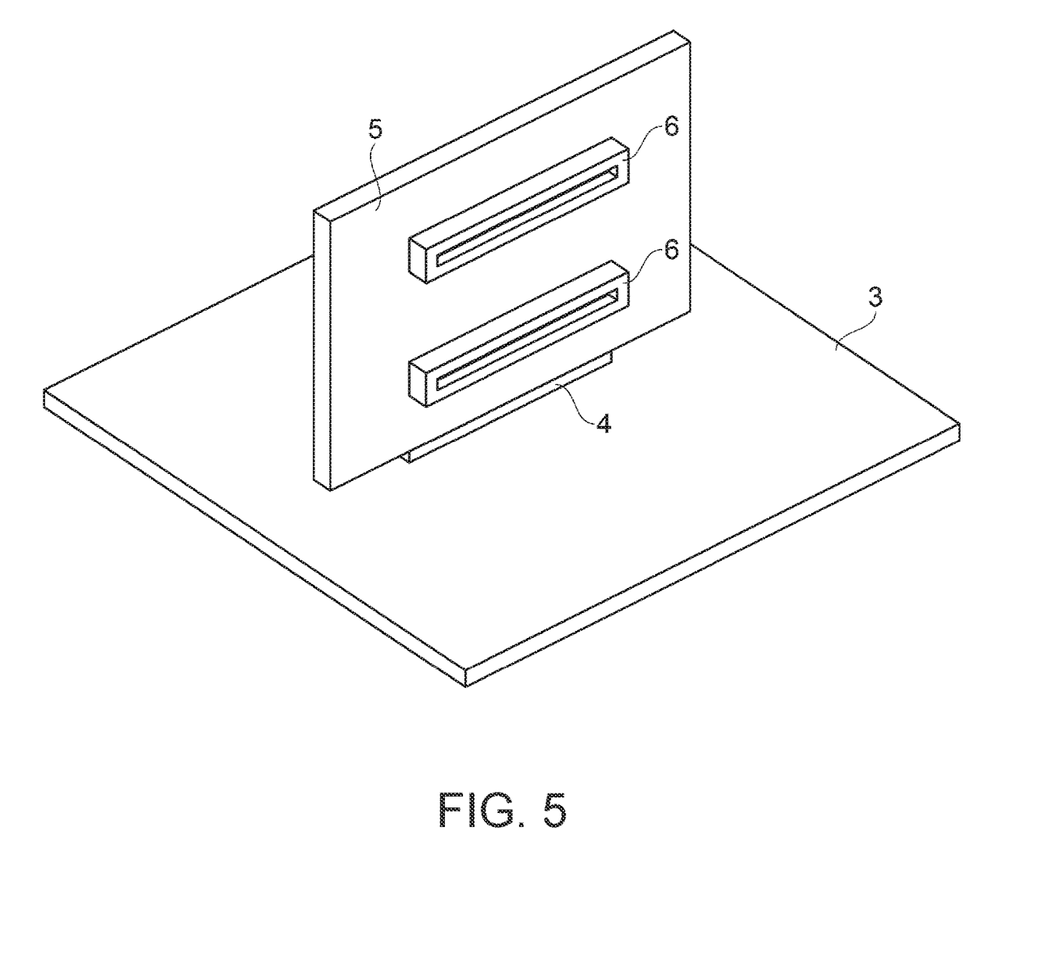
FIG. 5 is a perspective view showing a main board provided inside of the projector.

FIG. 3 is a perspective view showing the interface board 10 to be inserted into the slot 55, FIG. 4 is a side sectional view of the interface board 10. Further, FIG. 5 is a perspective view showing a main board 3 provided inside of the projector 1. Note that illustration of various electronic components etc. mounted on the interface board 10 and the main board 3 is omitted with some exceptions.

As shown in FIGS. 3 and 4, the interface board 10 has a main body part 11 to be inserted from the slot 55 into the projector 1, and a front panel 12 placed to close the slot with the main body part 11 inserted into the slot 55. The front panel 12 is formed using a metal plate or the like and fixed to the main body part 11. The main body part 11 includes a circuit board 13 on which various electronic components etc. are mounted, and a metal plate 14 formed to cover the circuit board 13 for protecting the circuit board 13.

On the front end portion (on the side to which the front panel 12 is fixed) of the circuit board 13, connection terminals to be connected to external apparatuses for inputting image information (hereinafter, referred to as "input terminals") are mounted. In the example shown in FIGS. 3 and 4, on the circuit board 13 of the interface board 10, a DVI (Digital Visual Interface) terminal 15 and two HDMI (registered trademark) (High Definition Multimedia Interface) terminals 16 are mounted as input terminals, and these input terminals are exposed on the front through the opening portions formed in the front panel 12. Further, on the rear end portion (on the opposite side to the front panel 12, i.e., the side in the direction in which the interface board 10 is inserted), a connection terminal 17 for connection to the main body of the projector 1 is mounted.

On the upper surface of the metal plate 14 covering the circuit board 13 of the interface board 10, a convex portion 14a projecting upward is formed. Further, as shown in FIG. 2, concave portions 55a corresponding to the convex portion 14a are formed on the upside of the peripheral edge portions of the slots 55. When the interface board 10 is inserted into the slot 55, the convex portion 14a of the metal plate 14 is moved through inside of the concave portion 55a of the slot 55. On the other hand, such concave portions 55a are not formed on the downside of the peripheral edge portions of the slots 55 and, if the user tries to insert the interface board 10 upside down by mistake, the convex portion 14a abuts on the peripheral edge portion of the slot 55 to prevent insertion of the interface board 10.

As shown in FIG. 5, the main board 3 provided inside of the projector 1 is a circuit board placed in parallel to the installation surface Ss when the projector 1 is installed on the installation surface Ss, and many electronic components etc. (not shown) are mounted thereon. A relay board 5 is connected to the main board 3 via a connection terminal 4, and the relay board 5 is placed in a position nearly parallel to the side surface 2s of the housing 2. On the relay board 5, two connection terminals 6 that can be connected to the connection terminal 17 of the interface board 10 are arranged one above the other, and the connection terminal 17 of the interface board 10 inserted from the slot 55 is connected to the connection terminal 6 on the relay board 5.

Returning to FIGS. 3 and 4, two through holes 18 corresponding to the screw holes 56 of the interface panel 44 are formed in the vicinities of each of the right and left outer edges of the front panel 12. The interface board 10 is inserted into the slot 55 and the connection terminal 17 is connected to the connection terminal 6, and then, screws are inserted through the through holes 18 and fastened. Further, holder members 19 formed by shaping of metallic circular columns in U-shapes are fixed to vicinities of the through holes on both right and left sides of the front panel 12. For detachment of the interface board 10 inserted into the slot 55 and connected to the connection terminal 6, the user may easily pull out the interface board 10 by holding the holder members 19 with fingers.

As described above, the projector 1 is adapted so that the user may connect and detach the interface board 10, and thereby, the user may easily add and replace the interface board 10. Accordingly, even when a desired input terminal is not provided in the projector 1, the user connects the interface board 10 having the input terminal to the projector 1, and thereby, can input image information using the desired input terminal.

Figure 6:
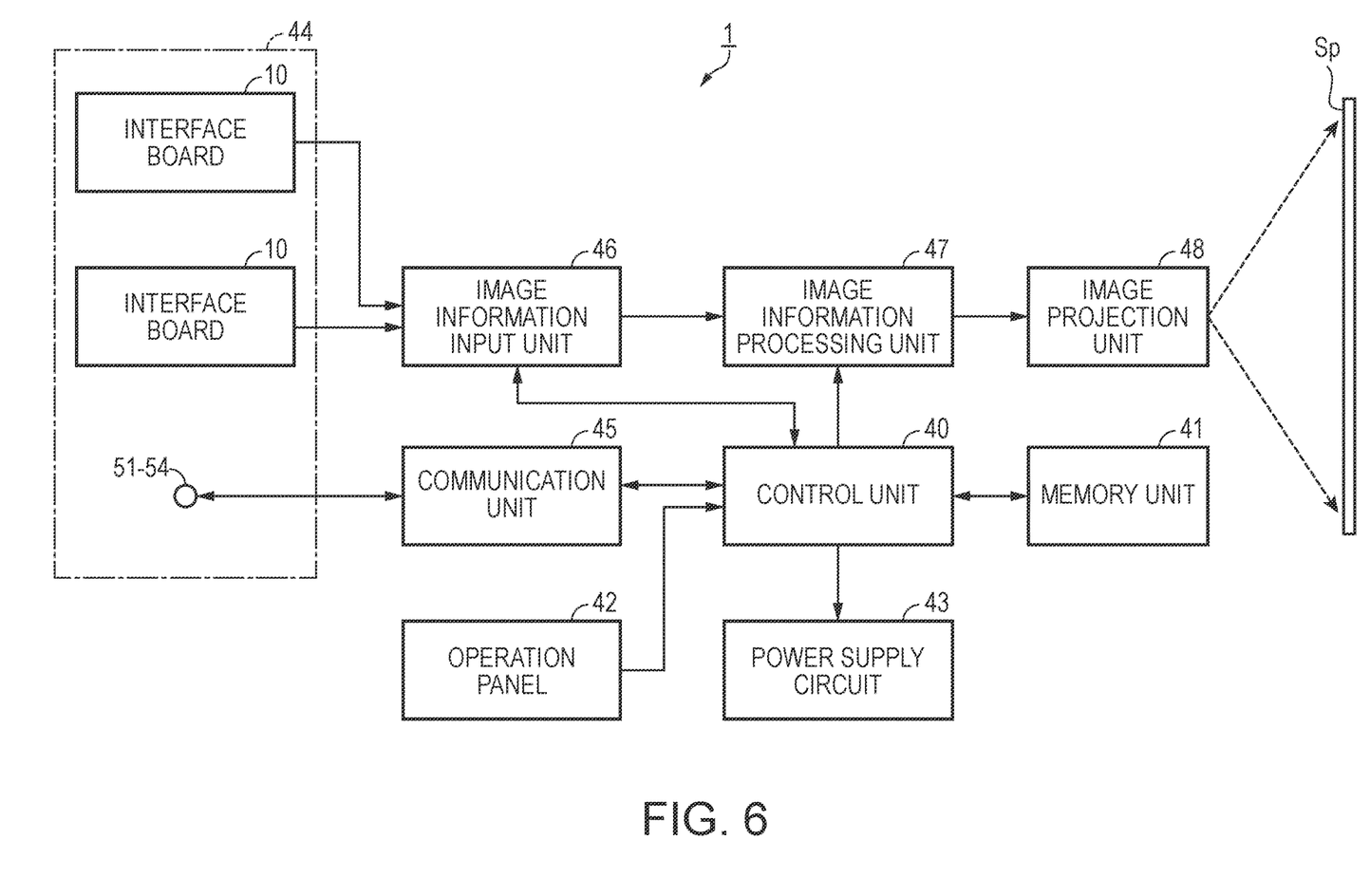
FIG. 6 is a block diagram showing a schematic configuration of the projector.
Figure 7:
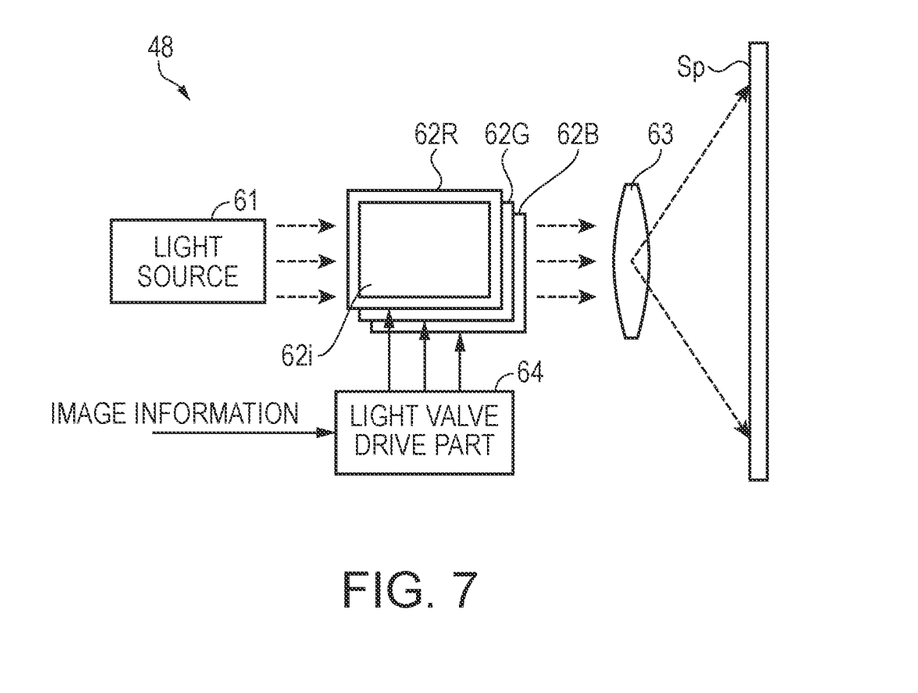
FIG. 7 is a block diagram showing a schematic configuration of an image projection unit.

FIG. 6 is a block diagram showing a schematic configuration of the projector 1, and FIG. 7 is a block diagram showing a schematic configuration of an image projection unit 48 provided in the projector 1.

As shown in FIG. 6, the projector 1 integrally includes a control unit 40, a memory unit 41, an operation panel 42 as an input operation unit, a power supply circuit 43, the interface panel 44, a communication unit 45, an image information input unit 46 as a connection unit, an image information processing unit 47, and an image projection unit 48 as a display unit. The projector 1 projects an image from the image projection unit 48 on a projection surface Sp based on image information input to the image information input unit 46.

The control unit 40 includes one or more processors, and performs integrated control of the operation of the projector 1 by operating according to the control programs stored in the memory unit 41.

The memory unit 41 includes memories such as a RAM (Random Access Memory) and a ROM (Read Only Memory). The RAM is used for temporary storage of various kinds of data etc. and the ROM stores the control programs, control data, etc. for control of the operation of the projector 1. Further, the memory unit 41 may store image information for projection from the image projection unit 48.

The operation panel 42 includes a plurality of operation keys for the user to give various commands to the projector 1. The operation keys of the operation panel 42 include "power key" for switching on and off of power, "menu key" for display of a menu image for environmental settings, "input switch key" for switching of input terminals used for projection, etc. When the user operates the various operation keys of the operation panel 42, the operation panel 42 outputs operation signals according to the operations by the user to the control unit 40. Note that, in place of the operation panel 42, a remote (not shown) that enables remote control may be used as the input operation unit. In this case, the remote emits infrared operation signals according to the operations by the user and a remote signal receiving part (not shown) receives and transmits the signals to the control unit 40.

The power supply circuit 43 is externally provided with a commercial power supply (not shown) of AC 100 V or the like. The power supply circuit 43 converts the commercial power supply (alternating-current power supply) into a direct-current power supply at a predetermined voltage, and supply electric power to the respective parts of the projector 1 (illustration of the supply paths to the respective parts is omitted).

As described above, the interface panel 44 has the two slots 55 (see FIG. 2) for insertion of the interface boards 10, and the plurality of connection terminals 51 to 54 (LAN terminal 51, USB terminals 52, 53, and the RS-232C terminal 54) connected to external apparatuses.

The communication unit 45 is connected to the connection terminals 51 to 54 placed on the interface panel 44 and communicates with the external apparatuses (not shown, e.g. a network apparatus, computer, various peripheral apparatuses, etc.) connected to the connection terminals 51 to 54. Note that the communication unit 45 mainly transmits and receives control information etc., however, may transmit and receive image information via the communication unit 45.

The interface board 10 inserted into the slot 55 of the interface panel 44 is connected to an external image supply apparatus (not shown) such as a video reproduction apparatus or computer via the input terminal, and receives supply of image information from the image supply apparatus. The interface board 10 converts the supplied image information into image information in a predetermined format, and outputs the converted image information from the connection terminal 17 (see FIG. 4) to the image information input unit 46. The interface board 10 of the embodiment converts the image information supplied from the image supply apparatus into image information compliant with the TMDS (Transition Minimized Differential Signaling) transmission protocol, and outputs the information from the connection terminal 17 to the image information input unit 46. Note that the DVI standards and the HDMI standards are standards employing the TMDS transmission protocol as the transmission protocol, and thus, in the interface board 10 exemplified in FIGS. 3 and 4, regarding image information input to the DVI terminal 15 and the HDMI terminals 16, conversion of the image information is substantially unnecessary and conversion of the terminal arrangement or the like is performed.

To the image information input unit 46, one or two interface boards 10 are connected, and image information converted by the interface board 10, i.e., image information compliant with the TMDS transmission protocol is input via the connection terminal 6 (see FIG. 5). The image information input unit 46 outputs the input image information to the image information processing unit 47. Further, when a plurality of pieces of image information are input to the image information input unit 46, the image information input unit 46 selects one or more pieces of image information from the input plurality of pieces of image information and outputs the selected image information to the image information processing unit 47 based on the control by the control unit 40. Specifically, the image information input unit 46 selects image information input to the input terminal designated by the input switch key of the operation panel 42 and outputs the information to the image information processing unit 47.

The image information processing unit 47 performs various kinds of image processing on the image information input from the image information input unit 46 based on the control of the control unit 40, and outputs the processed image information to a light valve drive part 64 (see FIG. 7). For example, the image information processing unit 47 performs processing of adjusting image quality including brightness and contrast, processing of superimposing an OSD (on-screen display) image such as the menu image or message image, etc. on the image information as appropriate.

Note that the image information input unit 46 and the image information processing unit 47 may be formed using one or more processors or the like, or formed using a dedicated processing unit such as an ASIC (Application Specific Integrated Circuit) or FPGA (Field Programmable Gate Array).

As shown in FIG. 7, the image projection unit 48 includes a light source 61, three liquid crystal light valves 62R, 62G, 62B as light modulation devices, the projection system 63, the light valve drive part 64, etc. The image projection unit 48 modulates light output from the light source 61 using the liquid crystal light valves 62R, 62G, 62B and forms image lights, and projects the image lights from the projection system 63 including a projection lens etc. and displays an image on the projection surface Sp.

The light source 61 includes a discharge light source lamp such as an ultra high-pressure mercury lamp or metal halide lamp or a solid-state light source such as a light emitting diode or semiconductor laser. The light output from the light source 61 is converted into light having a nearly homogeneous luminance distribution using an optical integration system (not shown), separated into respective color light components of red (R), green (G), blue (B) as three primary colors of light by a color separation system (not shown), and then, respectively enter the liquid crystal light valves 62R, 62G, 62B.

The liquid crystal light valves 62R, 62G, 62B respectively include transmissive liquid crystal panels with liquid crystal sealed between pairs of transparent substrates or the like. In each liquid crystal panel, a rectangular image formation area 62i having a plurality of pixels arranged in a matrix form is formed and a drive voltage can be applied to the liquid crystal with respect to each pixel.

The light valve drive part 64 forms images in the image formation areas 62i of the liquid crystal light valves 62R, 62G, 62B. Specifically, the light valve drive part 64 applies a drive voltage according to the image information input from the image information processing unit 47 to each pixel of the image formation area 62i and sets each pixel at light transmissivity according to the image information. The light output from the light source 61 is transmitted through the image formation areas 62i of the liquid crystal light valves 62R, 62G, 62B and modulated with respect to each pixel, and image lights according to the image information are formed with respect to each color. The formed image lights of the respective colors are combined with respect to each pixel by a color combining system (not shown) into image lights representing a color image, and enlarged and projected on the projection surface Sp by the projection system 63. As a result, an image (input image) based on the image information input to the image information input unit 46 is displayed on the projection surface Sp.

Figure 8:
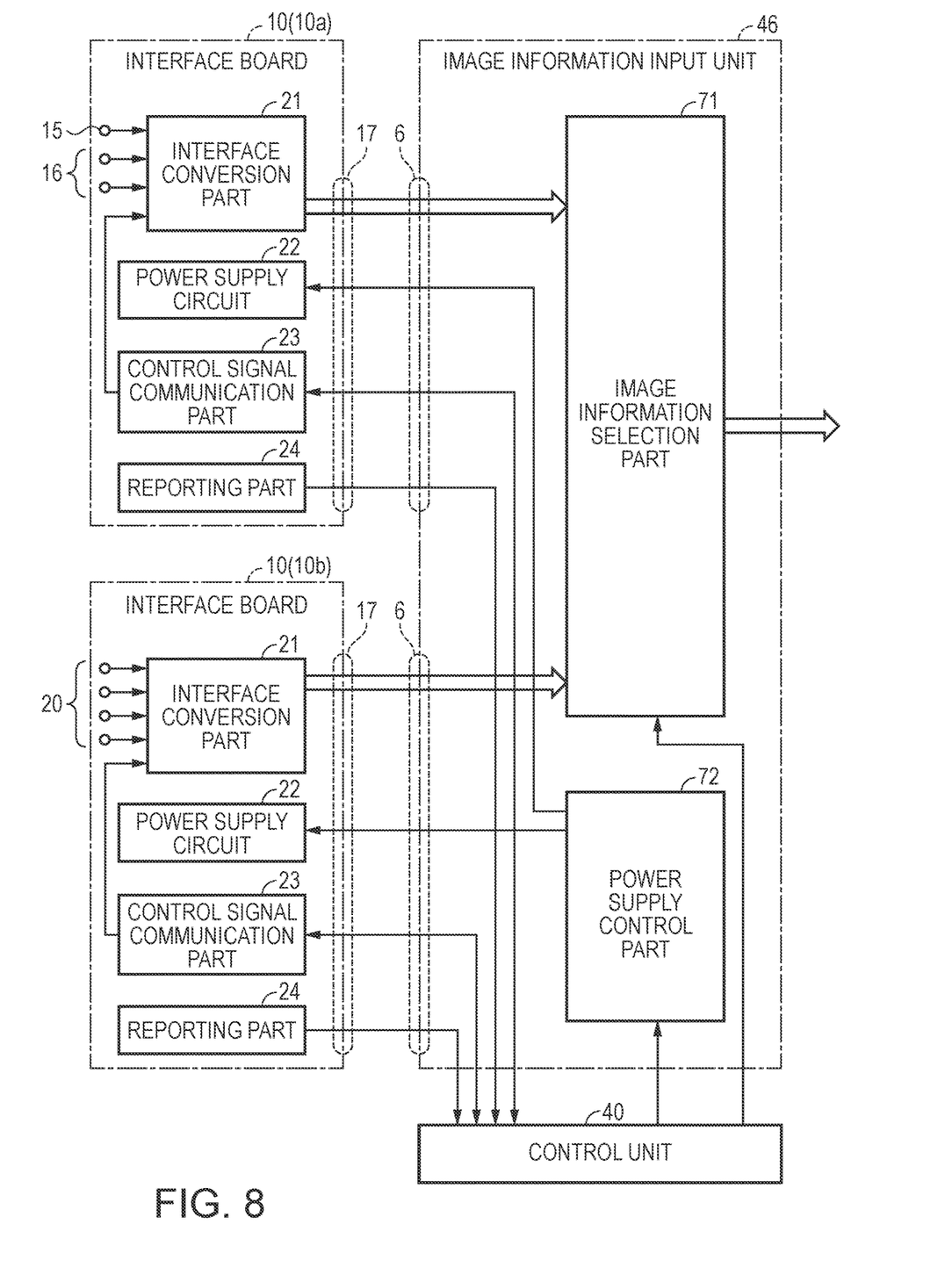
FIG. 8 is a block diagram showing internal configurations of an image information input unit of the projector and the interface boards.

FIG. 8 is a block diagram showing internal configurations of the image information input unit 48 of the projector 1 and the interface boards 10. Note that FIG. 8 shows that the two interface boards 10 (hereinafter, for distinction between these two, also referred to as "interface boards 10a, 10b") connected to the image information input unit 46. One interface board 10a has one DVI terminal 15 and two HDMI terminals 16 as input terminals like the interface board 10 shown in FIG. 3, and the other interface board 10b has four SDI (Serial Digital Interface) terminals 20 as input terminals.

As shown in FIG. 8, the interface board 10 has an interface conversion part 21, a power supply circuit 22, a control signal communication part 23, and a reporting part 24, and is connected to the image information input unit 46 via the connection terminals 17, 6.

The interface conversion part 21 performs processing of converting image information input to the input terminals (DVI terminal 15, HDMI terminals 16, and SDI terminals 20) into image information compliant with the TMDS transmission protocol. Note that, as described above, substantial conversion processing is unnecessary for the image information input to the DVI terminal 15 and the HDMI terminals 16.

The power supply circuit 22 receives power supply from a power supply control part 72 of the image information input unit 46 and supplies power to the respective parts of the interface boards 10.

The control signal communication part 23 receives control signals from the control unit 40 of the projector 1 via the image information input unit 46 and outputs the signals to the interface conversion part 21. Accordingly, the control unit 40 of the projector 1 may control the conversion processing by the interface conversion part 21 via the control signal communication part 23. Further, the control signal communication part 23 has a function, when power supply from the projector 1 is started and the interface boards 10 are normally activated, of transmitting information representing that the interface boards 10 can be normally activated to the projector 1, and a function, when a predetermined control signal is transmitted from the projector 1 to the control signal communication part 23, of transmitting information representing that the control signal can be normally received to the projector 1.

The reporting part 24 reports connection information and type information to the control unit 40 of the projector 1 via the image information input unit 46. Specifically, the reporting part 24 outputs a predetermined bit as connection information, and thereby, reports that the interface boards 10 are appropriately connected to the projector 1 (connection terminals 6). Further, the reporting part 24 outputs bit strings according to the types of the interface boards 10 as type information, and thereby, reports the types of the interface boards 10 to the projector 1. That is, the interface board 10a and the interface board 10b output the respective different bit strings as the type information. Here, the types of the interface boards 10 are determined by e.g. the types and numbers of input terminals of the interface boards 10. As described above, the control unit 40 of the projector 1 may determine the appropriate connection of the interface boards 10 and the types of the connected interface boards 10 based on the report from the reporting part 24.

Note that the interface conversion part 21 and the control signal communication part 23 may be formed using one or more processors or the like, or formed using a dedicated processing unit such as an ASIC (Application Specific Integrated Circuit) or FPGA (Field Programmable Gate Array).

The image information input unit 46 of the projector 1 includes an image information selection part 71 and the power supply control part 72.

The image information selection part 71 is a multiplexer that selects one piece of image information from a plurality of pieces of image information input from the interface boards 10 based on the control by the control unit 40, and outputs the selected image information to the image information processing unit 47.

The power supply control part 72 supplies the direct-current power supply converted by the power supply circuit 43 of the projector 1 to the power supply circuits 22 of the interface boards 10 based on the control by the control unit 40.

Next, an operation (control method) of the projector 1 will be explained.

When the interface board 10 is connected to the projector 1 and the power is turned on, the projector 1 can project an image based on the image information input to the input terminal of the interface board 10. Further, the user may individually set the respective input terminals provided in the interface board 10 to be enabled or disabled. Specifically, when the user performs a predetermined operation on the operation panel 42, the control unit 40 gives a command to the image information processing unit 47 to display a menu image (OSD image, not shown) with which each input terminal can be set to be enabled or disabled. When the menu image is displayed, the user may set each input terminal to be enabled or disabled by the operation of the operation panel 42. Here, the input terminals set to be disabled are excluded from objects of switching when switching of the input terminals, and the user can efficiently switch the input terminals by setting the input terminals not expected to be used to be disabled. The information set by the user, i.e., the information representing whether the respective input terminals are enabled or disabled is stored as terminal information in the memory unit 41.

Figure 9A:
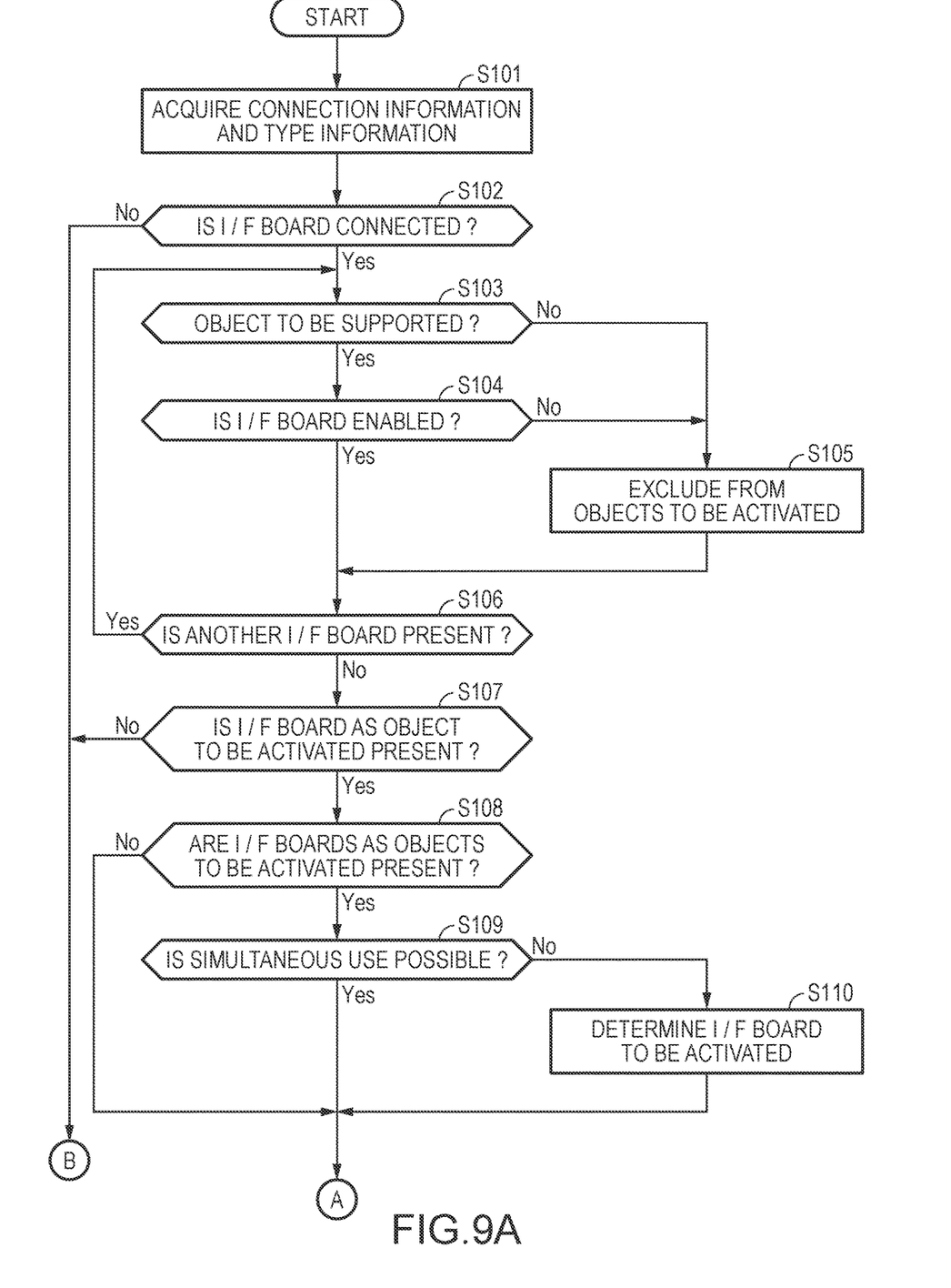
FIG. 9A is a flowchart for explanation of an operation of the projector.
Figure 9B:
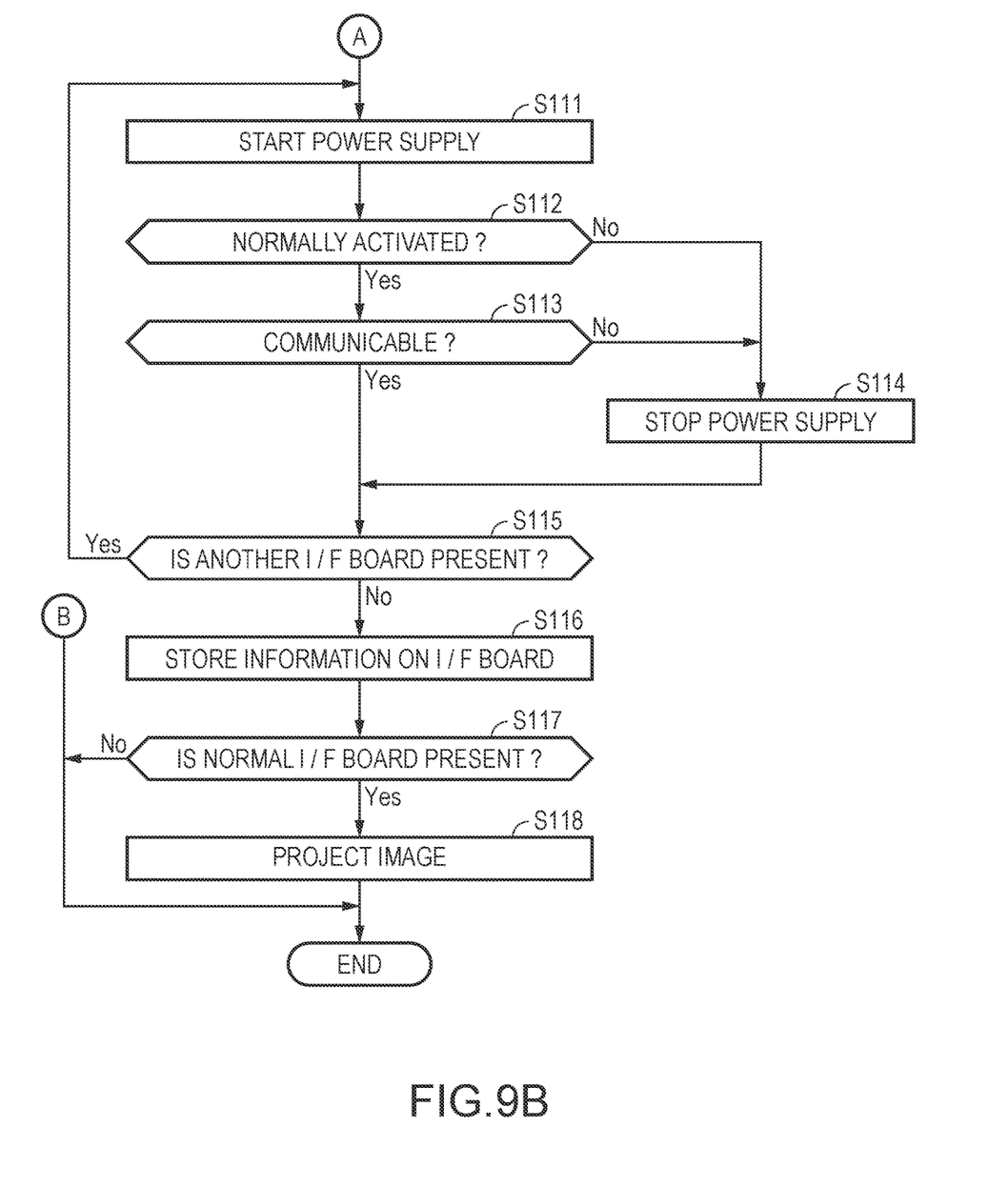
FIG. 9B is a flowchart for explanation of the operation of the projector.

FIGS. 9A and 9B are flowcharts for explanation of the operation of the projector 1. When the projector 1 is turned on, the control unit 40 of the projector 1 is activated and operates according to the flows shown in FIGS. 9A and 9B. Note that, in FIGS. 9A and 9B, "interface board" is abbreviated as "I/F board".

As shown in FIG. 9A, at step S101, the control unit 40 acquires the connection information and type information reported from the reporting parts 24 of the respective interface boards 10. Then, the control unit 40 recognizes whether or not the interface boards 10 are connected to the respective connection terminals 6 and determines the type of the connected interface boards 10.

At step S102, the control unit 40 determines whether or not the interface board 10 is connected to at least one of the two connection terminals 6 based on the acquired connection information. Then, if the interface board 10 is connected to one of the connection terminals 6, the control unit 40 moves the processing to step S103. On the other hand, if the interface board 10 is connected to none of the connection terminals 6, the control unit 40 gives a command to the image information processing unit 47 to project an OSD image (message image) for reporting that no interface board 10 is connected to the user, and ends the processing.

If the processing is moved to step S103, the control unit 40 determines whether or not one interface board 10 is an object to be supported based on the type information acquired from the reporting part 24. In the memory unit 41, a list of the types of the interface boards 10 as objects to be supported with respect to use in the projector 1 is stored as support information, and the control unit 40 refers to the support information and determines whether or not the connected interface board 10 is the object to be supported. Then, if the interface board 10 is the object to be supported, the control unit 40 moves the processing to step S104, and, if the interface board 10 is not the object to be supported, moves the processing to step S105. Note that the projector 1 sets the interface board 10 as the object to be supported when the projector can stably supply electric power consumed by the interface board 10.

If the interface board 10 is the object to be supported and the processing is moved to step S104, the control unit 40 determines whether or not the interface board 10 is enabled or disabled based on the terminal information stored in the memory unit 41. If at least one input terminal is set to be enabled of the input terminals provided in the interface board 10, the control unit 40 determines that the interface board 10 is enabled and moves the processing to step S106. On the other hand, if all of the input terminals are set to be disabled, the control unit 40 determines that the interface board 10 is disabled and moves the processing to step S105.

If the interface board 10 is not the object to be supported or all of the input terminals are set to be disabled, and the processing is moved to step S105, the control unit 40 excludes the interface board 10 from the objects to be activated and moves the processing to step S106. Note that power is not supplied from the projector 1 to the interface board 10 excluded from the objects to be activated, and power is supplied later from the projector 1 to the interface board 10 not excluded from the objects to be activated.

At step S106, the control unit 40 determines whether or not another connected interface board 10 is present. Then, if another connected interface board 10 is present, the control unit 40 returns the processing to step S103 and repeats the operations at steps S103 to S105 with respect to the next interface board 10. On the other hand, if no other connected interface board 10 is present, the control unit 40 moves the processing to step S107.

At step S107, the control unit 40 determines whether or not one or more interface boards 10 as the objects to be activated are present. Then, if one or more interface boards 10 as the objects to be activated are present, the control unit 40 moves the processing to step S108. On the other hand, if no interface board 10 as the object to be activated is present, the control unit 40 gives a command to the image information processing unit 47 to project an OSD image (message image) for reporting that no interface board 10 as the object to be activated is present to the user, and ends the processing.

If the processing is moved to step S108, the control unit 40 determines whether or not a plurality (two) of the interface boards 10 as the objects to be activated are present. Then, if the plurality of interface boards are present, the control unit moves the processing to step S109, and, if only one interface board is present, the control unit moves the processing to step S111 (see FIG. 9B).

If the processing is moved to step S109, the control unit 40 determines whether or not the two interface boards 10 as the objects to be activated can be used simultaneously. In the memory unit 41, a list of combinations of the interface boards 10 that can be used simultaneously based on the power consumption of the respective interface boards 10 is stored as combination information in advance, and the control unit 40 determines whether or not the connected two interface boards can be used simultaneously based on the combination information. Then, if the simultaneous use is possible, the control unit 40 moves the processing to step S111 (see FIG. 9B), and, if the simultaneous use is not possible, moves the processing to step S110.

If the simultaneous use of the two interface boards 10 is not possible and the processing is moved to step S110, the control unit 40 determines one to be activated of the interface boards 10 based on priority information stored in the memory unit 41, and moves the processing to step S111 (see FIG. 9B). That is, the control unit 40 excludes the other interface board 10 from the objects to be activated and supplies no power. The priority information is information representing the priority of the respective types of interface boards 10 and stored in the memory unit 41 in advance. The priority represented by the priority information may be arbitrarily set by the user or determined by the control unit 40 based on the use records etc. in the past.

As shown in FIG. 9B, at step S111, the control unit 40 controls the power supply control part 72 to start power supply to one interface board 10 of the interface boards 10 as the objects to be activated.

At step S112, the control unit 40 determines whether or not the interface board 10 has been normally activated, i.e., whether or not information representing that the interface board 10 can be normally activated has been transmitted from the control signal communication part 23 of the interface board 10. Then, if receiving the information from the interface board 10, the control unit 40 moves the processing to step S113, and, if not receiving the information, moves the processing to step S114.

If the processing is moved to step S113, the control unit 40 determines whether or not communication can be normally made with the interface board 10. Specifically, the control unit 40 transmits a predetermined control signal to the interface board 10 and determines whether or not information representing that the control signal can be normally received has been transmitted from the interface board 10 in response thereto. Then, if receiving the information representing that the control signal has been normally received, i.e., if the normal communication is possible, the control unit 40 moves the processing to step S115, if not receiving the information representing that the control signal has been normally received, i.e., if the normal communication is not possible, moves the processing to step S114.

If at least one of the information representing that the interface board 10 can be normally activated and the information representing that the control signal has been normally received is not received and the processing is moved to step S114, the control unit 40 controls the power supply control part 72 to stop power supply to the interface board 10 and moves the processing to step S115.

At step S115, the control unit 40 determines whether or not another interface board 10 as the object to be activated is present. Then, if another interface board 10 as the object to be activated is present, the control unit 40 returns the processing to step S111, and repeats the operations at step S111 to S114 with respect to the other interface board 10. On the other hand, if no other interface board 10 as the object to be activated is present, the control unit 40 moves the processing to step S116.

At step S116, the control unit 40 stores various kinds of information on the connected interface board 10 in the memory unit 41. Specifically, the control unit 40 stores the information representing which type of interface board 10 is connected to which connection terminal 6, the information representing whether the respective input terminals of the interface board 10 are enabled or disabled, etc. in the memory unit 41. Further, the control unit 40 may acquire version information of firmware of the interface boards 10 etc. from the interface boards 10 and store the information in the memory unit 41 in advance.

At the subsequent step S117, the control unit 40 determines whether or not the normal interface board 10, i.e., the interface board normally activated with maintained power supply is present. Then, if the normal interface board 10 is present, the control unit 40 moves the processing to step S118. On the other hand, if the normal interface board 10 is not present, the control unit 40 gives a command to the image information processing unit 47 to project an OSD image (message image) for informing the user that the interface board 10 is abnormal, and ends the processing.

If the processing is moved to step S118, the control unit 40 gives a command to the image information selection part 71 to allow the image information processing unit 47 to output the image information input to the input terminal selected by the input switch key of the operation panel 42. As a result, the image according to the image information is projected from the image projection unit 48 onto the projection surface Sp.

As described above, according to the projector 1 of the embodiment and the control method therefor, the following advantages may be obtained.

(1) According to the embodiment, the control unit 40 of the projector 1 determines whether or not the connected interface board 10 is the object to be supported based on the type information of the interface board 10 connected to the image information input unit 46, if the board is not the object to be supported, do not supply power to the interface board 10. In this manner, the control unit 40 restricts power supply to the interface board 10 based on the type of the interface board 10, and thereby, supply of excessive electric power to the interface board 10 can be suppressed.

According to the embodiment, in the case where a plurality of (two) interface boards 10 are connected to the image information input unit 46, if the simultaneous use of the boards is possible, the control unit 40 supplies power to all interface boards 10 and, if the simultaneous use is not possible, does not supply power to part of (one) the interface boards. In this manner, the control unit 40 restricts the power supply to the interface board 10 based on the number of connected interface boards 10, and thereby, even when the plurality of interface boards 10 are connected, supply of excessive electric power to the interface boards 10 can be suppressed.

(3) According to the embodiment, the respective input terminals provided in the connected interface board 10 can be individually set to be enabled or disabled by the user, if one of the input terminals is enabled, the control unit 40 determines that the interface board 10 is enabled, and, if all of the input terminals are disabled, determines that the interface board 10 is disabled. Then, if the interface board 10 is set to be disabled, the control unit 40 does not supply power to the interface board 10 and wasted power consumption can be suppressed.

(4) According to the embodiment, the image information is input from the external image supply apparatus to the image information input unit 46 via the interface board 10, and thereby, image information in various formats can be input by addition or replacement of the interface board 10.

(5) According to the embodiment, the control unit 40 starts power supply if the unit determines that the interface board 10 is appropriately connected based on the connection information reported from the interface board 10, and thereby, power supply to the interface board 10 not appropriately connected is suppressed.

(6) According to the embodiment, the control unit 40 acquires the type information representing the type of the connected interface board 10, and thereby, other control than the control of power supply (e.g. control of the interface conversion part 21) can be appropriately performed according to the type of the interface board 10.

(7) According to the embodiment, all of the interface boards 10 convert image information in various formats input from the external image supply apparatus into image information compliant with specific standards (TMDS transmission protocol in the embodiment). Accordingly, even in the case where the image information that can be processed in the projector 1 is limited to image information compliant with specific standards, image information in various formats can be input from the external image supply apparatus by addition or replacement of the interface board 10.

(8) According to the embodiment, power supply is stopped if the interface board 10 is not normally activated or communication with the interface board 10 is impossible after starting power supply to the interface board 10, and thereby, continuous power supply to the interface board 10 with an abnormality can be suppressed.

(9) According to the embodiment, even in the case where two interface boards 10 are connected to the projector 1 and one of the boards is excluded from the objects to be activated or an abnormality is detected after activation and power supply is stopped, if the other interface board 10 is normal, image projection based on the image information input to the interface board 10 may be performed. Accordingly, unavailability of the projector 1 due to an abnormality of the single interface board 10 or the like may be avoided.

(10) According to the embodiment, the interface board 10 is adapted not to be inserted upside down by the convex portion 14a provided on the interface board 10 and the concave portion 55a provided in the slot 55 of the interface panel 44, and thereby, breakage of the interface board 10 and the projector 1 due to insertion in the wrong position can be suppressed.

Note that, in the embodiment, the control unit 40 when determining the type of the connected interface board 10 based on the type information reported from the reporting part 24 of the interface board 10 corresponds to a determination unit. Further, the control unit 40, the image information processing unit 47, and the operation panel 42 when displaying the menu image by the image information processing unit 47 and allowing the user to set the respective input terminals to be enabled or disabled using the operation panel 42 correspond to a setting unit.

Modified Examples

The above described embodiment may be changed as below.

In the above described embodiment, the control unit 40 may determine the amount of power supply to the interface board 10 according to the type of the interface board 10 as the object to be activated. According to the configuration, power in the appropriate amount according to the type of the interface board 10 can be supplied and, even when an abnormality or the like is caused in the interface board 10, supply of excessive power may be suppressed.

In the above described embodiment, the control unit 40 does not supply power to the interface board 10 excluded from the objects to be activated and the interface board 10 not normally activated or communicated, however, minimum power may be supplied as long as the power supply is restricted.

In the above described embodiment, no input terminal for inputting image information is provided on the interface panel 44 and the image information is input via the input terminal of the connected interface board 10, however, the configuration is not limited to that. For example, several input terminals may be provided on the interface panel 44 in advance and other input terminals can be added by the interface board 10.

In the above described embodiment, when the user performs a predetermined operation on the operation panel 42, the control unit 40 may display information representing the type of the connected interface board 10, version information of the firmware of the interface board 10, or the like as an OSD image or output the information from the communication unit 45 to an external apparatus.

Further, in the case where the projector 1 is connected to a network, when the version of the firmware of the interface board 10 connected to the projector 1 is not the latest, the control unit 40 may display a method of obtaining the latest firmware or the like as an OSD image or automatically download the latest firmware from a server and update the version. Similarly, regarding the firmware (control program) of the projector 1, the control unit 40 may give guidance to the user about a method of obtaining firmware suitable for the type of the connected interface board 10 and the version thereof or automatically download appropriate firmware and update the version.

In the above described embodiment, the control unit 40 may control power supply to the downstream circuit (image information processing unit 47) according to the type of the determined interface board 10. Specifically, in the case where it is unnecessary to perform processing by a specific circuit block on the image information input from the connected interface board 10, power supply to the circuit block may be stopped. For example, in the case where a circuit block for performing processing only on the image information input from the specific interface board 10 is provided, when the specific interface board 10 is not connected, power supply to the circuit block is stopped, and thereby, wasted power consumption can be suppressed.

In the above described embodiment, when the interface board 10 is not inserted into one of the two slots 55 of the interface panel 44, it is desirable to close the slot 55 by a cover member to prevent entry of dust or foreign matter from the slot 55.

Figure 10:
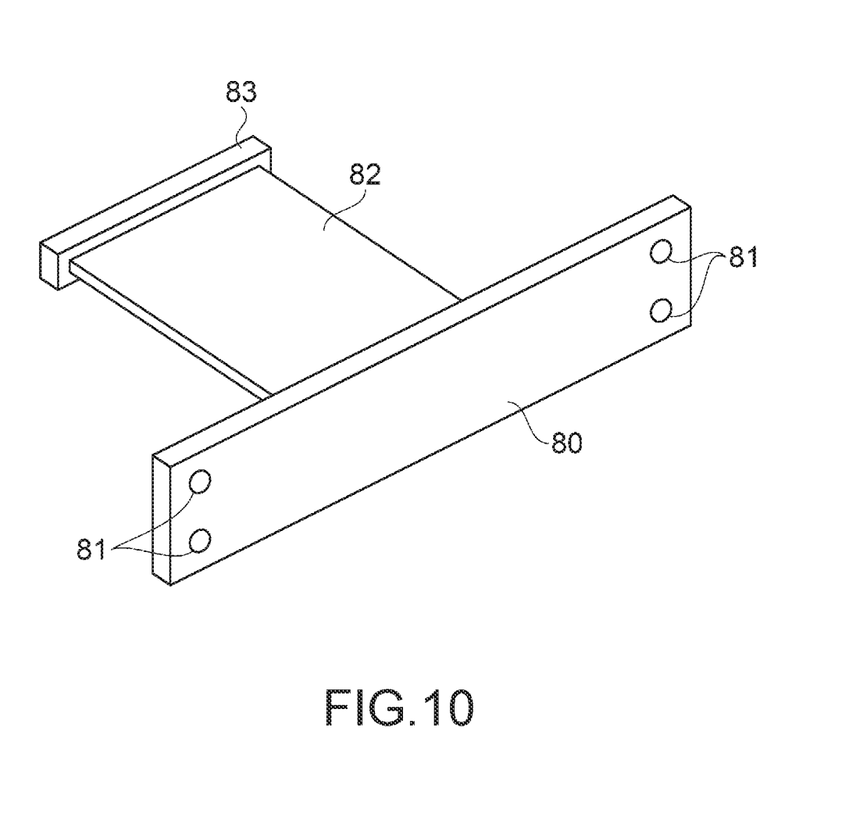
FIG. 10 is a perspective view showing an example of a cover member.

FIG. 10 is a perspective view showing an example of the cover member. As shown in FIG. 10, the cover member 80 is formed using e.g. a plate-like member made of a metal or resin and through holes 81 for screwing into the screw holes 56 of the interface panel 44 are formed in both sides on the right and left. Further, a terminal cover 83 is fixed to the cover member 80 via an extension member 82. The terminal cover 83 covers the connection terminals 6 on the relay board 5 with the slots 55 closed by the cover member 80. Accordingly, the slots 55 are closed by the cover member 80, and thereby, entry of dust or the like from the slots 55 can be prevented and corrosion or the like of the connection terminals 6 can be prevented.

In the above described embodiment, as the example of the interface board 10, the interface board 10a having the single DVI terminal 15 and the two HDMI terminals 16 and the interface board 10b having the four SDI terminals are shown, however, the type and the number of input terminals provided in the interface board 10 are not limited to those.

Further, the input terminals provided in the interface board 10 are not limited to the input terminals for inputting digital image information, but may be input terminals for inputting analog image information.

In the above described embodiment, the configuration of the interface board 10 is not limited to the configuration including the input terminals to which image information is input. For example, the interface board 10 may have a configuration including connection terminals for communication or control such as a LAN terminal, USB terminal, and RS-232C. In this case, the communication unit 45 functions as a connection unit and the interface board 10 is connected to the communication unit 45. Then, the communication unit 45 can transmit and receive control information or the like to and from an external apparatus via the interface board 10. According to the configuration, control information in various formats can be transmitted and received by addition or replacement of the interface board 10.

In the above described embodiment, the control unit 40 determines the type of the interface board 10 based on the bit string output from the reporting part 24 of the interface board 10, however, the determination method of the type is not limited to that. For example, a memory device such as a ROM with type information stored therein may be provided in the interface board 10 and the control unit 40 may read the type information from the memory device.

In the above described embodiment, the interface board 10 converts the image information input to the input terminals into image information compliant with the TMDS transmission protocol, however, may convert the image information into image information compliant with other standards or unique standards.

In the above described embodiment, the configuration of the interface board 10 is not limited to the configuration in wired connection to an external apparatus via the input terminal (connection terminal), but may be a configuration in wireless connection to an external apparatus.

In the above described embodiment, the example in which the two interface boards 10 of the different types are connected to the image information input unit 46 is shown, however, the two interface boards 10 of the same type can be connected and used.

In the above described embodiment, the configuration that can connect the two interface board 10 is shown, however, the number of connectable interface boards 10 is not limited to two, but may be one, three, or more.

In the above described embodiment, the transmissive liquid crystal light valves 62R, 62G, 62B are used as the light modulation devices, however, reflective light modulation devices such as reflective liquid crystal light valves can be used. Or, a digital mirror device that modulates the light output from the light source 61 by controlling the output direction of the entering light with respect to each micromirror as a pixel or the like may be used. Or, the configuration is not limited to the configuration including the plurality of light modulation devices with respect to each color light, but may be a configuration of modulating a plurality of color lights time-divisionally by a single light modulation device.

In the above described embodiment, the projector 1 is explained as an example of the image display apparatus, however, the image display apparatus is not limited to the projector 1, but may be another image display apparatus such as a liquid crystal display or organic EL display.

What is claimed is:

1. An image display apparatus comprising:
    a display unit that displays an image;
    a connection unit connected to a replaceable interface board and being configured to communicate with an external apparatus via the interface board; and
    a processor programmed to:
      determine a type of the interface board connected to the connection unit, and
      restrict power supply to the interface board based on the determined type of the interface board.

2. The image display apparatus according to claim 1, wherein
    a plurality of the interface boards are connected to the connection unit, and
    the processor restricts power supply to the interface boards based on the number of the interface boards connected to the connection unit.

3. The image display apparatus according to claim 1, further comprising
    a setting unit configured to set the interface board in an enabled state or a disabled state, wherein
    the processor restricts power supply to the interface board when the interface board is set to the disabled state.

4. The image display apparatus according to claim 1, wherein
    image information is input from the external apparatus to the connection unit via the interface board, and
    the display unit displays the image based on the image information input to the connection unit.

5. The image display apparatus according to claim 4, wherein,
    when a first interface board and a second interface board are connected to the connection unit as the interface boards and power supply to the first interface board is restricted, the display unit displays the image based on the image information input to the second interface board.

6. The image display apparatus according to claim 1, wherein the connection unit transmits and receives control information to and from the external apparatus via the interface board.

7. The image display apparatus according to claim 1, wherein,
    when acquiring connection information representing that the interface board is appropriately connected to the connection unit from the interface board, the processor starts power supply to the interface board.

8. A control method for an image display apparatus connected to a replaceable interface board and being configured to communicate with an external apparatus via the interface board, the control method comprising:
    determining a type of the connected interface board; and
    restricting power supply to the interface board based on the determined type of the interface board.

* * * * *